United States Patent [19]

Lechner et al.

[11] Patent Number: 5,043,977
[45] Date of Patent: Aug. 27, 1991

[54] METHOD AND A CIRCUIT ARRANGEMENT FOR SETTING THE SUBSCRIBER LINE DUMMY IMPEDANCES OF PROGRAMMABLE HYBRID CIRCUITS

[75] Inventors: Robert Lechner, Sankt Poelten, Austria; Moni Malek, Munich, Fed. Rep. of Germany

[73] Assignee: Siemens Aktiengesellschaft, Berlin and Munich, Fed. Rep. of Germany

[21] Appl. No.: 474,316

[22] Filed: Jan. 31, 1990

Related U.S. Application Data

[63] Continuation-in-part of Ser. No. 163,906, Mar. 3, 1988, abandoned.

[30] Foreign Application Priority Data

Apr. 14, 1987 [DE] Fed. Rep. of Germany ....... 3712662

[51] Int. Cl.⁵ .............................................. H04B 3/20
[52] U.S. Cl. .................................. 370/32.1; 379/398; 379/406; 379/402
[58] Field of Search ................ 379/398, 401, 402, 403, 379/404, 406; 370/32, 32.1, 58

[56] References Cited

U.S. PATENT DOCUMENTS

| 4,161,633 | 7/1979 | Treiber ........................... 379/402 X |
| 4,254,305 | 3/1981 | Treiber ........................... 379/398 X |
| 4,381,561 | 4/1983 | Treiber ........................... 379/398 X |
| 4,489,222 | 12/1984 | Lusignan et al. ................... 379/402 |
| 4,685,103 | 8/1987 | Black ..................................... 379/58 |

FOREIGN PATENT DOCUMENTS

| 3409877 | 9/1985 | Fed. Rep. of Germany ...... 379/404 |
| 0122580 | 9/1981 | Japan ..................................... 370/32 |
| 2159022 | 11/1985 | United Kingdom ................ 379/402 |

OTHER PUBLICATIONS

AM7950-Advance Information and Application Notes, Jun. 1984 and Jun. 1985, Advanced Micro Devices.

Primary Examiner—Jin F. Ng
Assistant Examiner—M. Shehata
Attorney, Agent, or Firm—Adel A. Ahmed

[57] ABSTRACT

A control unit of a subscriber line termination module has access via a programmable interface to the transmitting and receiving arms of a time division multiplex line connected to the switching network. At intervals which are long in relation to the pulse frame length, during the course of existing connections, PCM-words which occur N-times on the receiving arm and, in each case following a reflection time, during a plurality of pulse frames, a plurality of PCM-words occurring on the transmitting arm are received, subjected to amplitude evaluation and, if recognized as valid, subjected to cross-correlation. The result of the cross-correlation provides a control value for the dummy impedance.

8 Claims, 3 Drawing Sheets

METHOD AND A CIRCUIT ARRANGEMENT FOR SETTING THE SUBSCRIBER LINE DUMMY IMPEDANCES OF PROGRAMMABLE HYBRID CIRCUITS

CROSS-REFERENCE TO RELATED APPLICATION

This is a continuation-in-part of Ser. No. 07/163,906 filed Mar. 3, 1988 now abandoned.

The invention relates to a method and a circuit arrangement for setting the subscriber line dummy impedances of programmable hybrid circuits for the two-wire/four-wire junction, which form part of subscriber line termination modules which are combined in a subscriber line termination module of a digital time division multiplex (t.d.m.) telecommunications exchange and which are subject to the control influence of a module-individual control unit.

Reflections at contact points of different line sections in line telephone links can give rise to echoes. The majority of the echoes arise in the hybrid circuits which form two-wire/four-wire junctions. In addition to the echoes at hybrid circuits remote from the subscribers, which can in themselves lead to a substantial reduction in the quality of the telephone connection, echoes also occur at hybrid circuits close to the subscribers, thus giving rise to multiple reflections, which results in the listening subscriber being exposed to a hollow quality sound effect. If echoes of different line sections are superimposed, instabilities can also occur which manifest themselves in whistling tones. The last-mentioned effect, which primarily can occur in the case of trunk connections, can be controlled to a certain extent by interposing attenuating elements. However, this measure cannot be employed beyond the point at which the increase in attenuation leads to a reduction in volume no longer acceptable.

In such cases echo traps can be used, that is, devices which actuate an attenuating element with high attenuation in the transmitting path of a four-wire connection when the speech level in the receiving path exceeds a specified value. In a special embodiment of these echo traps, so-called differential echo traps, the attenuating element is de-actuated when the transmitting level exceeds the receiving level, so that interjections of a telephone subscriber currently listening are not likewise suppressed by the echo trap, provided they are sufficiently loud.

Echo compensators can also be used, the principle of which consists in using a filter, which simulates the transmission characteristics of the echo path, to derive from the useful signal an image of the echo as compensation signal which is subtracted from the actual echo and thus cancels the echo.

The cause of reflection in hybrid circuits lies in the non-exact simulation of the impedance of the two-wire line connected to the hybrid circuit by a dummy network which represents part of the hybrid circuit.

To avoid the need to specially match the dummy network in each individual example of a subscriber line, in known cases compromise values are used for the dummy impedance, which simply distinguish between values for long and short subscriber lines. If the subscriber line is a "pupinized" or loaded line, this can also be taken into account by using a standard value for loaded subscriber lines.

In digital telephone exchange systems, in practice this setting is effected either manually on the subscriber line termination circuits to which the hybrid circuits are assigned or by means of a software command given from the operator console of the switching system. However, for this purpose, both in the planning of new exchanges and also for the later connection of additional subscriber lines, data relating to the physical properties of the subscriber lines in question must be available, thus information as to whether the lines are long or short and whether they are loaded or not.

The aim of the present invention is to provide a method and a circuit arrangement by means of which, in association with a digital t.d.m. telecommunications exchange, and assuming that the subscriber line termination circuits are combined to form a subscriber line termination module, the facility of adapted setting of the simulation of the subscriber line impedances is provided.

In accordance with an aspect of the invention, this aim is fulfilled by a method of the type referred to in the introduction which is characterized in that via a programmable interface circuit the module-individual control unit gains access to the transmitting- and receiving arms of at least one four-wire-t.d.m.-line, which connects the subscriber line termination circuits to the switching network of the telephone exchange, such that, individually for the individual subscriber line termination circuits, in the course of a respective telecommunications connection to a respective subscriber line termination circuit and/or to the subscriber terminal connected thereto via a subscriber line, at arbitrary intervals which, however, are long in comparison to the length of the sampling pulse frames, one PCM-word which occurs on the receiving arm of the at least one four-wire-t.d.m. line in the time slot allocated to the connection is received, and in each case following a number of sampling pulse frames corresponding to a delay time governed by an echo signal which occurs as a result of reflection at the hybrid circuit of the subscriber line termination circuit, PCM-words which occur on the transmitting arm during corresponding time slots of a plurality of consecutive sampling pulse frames are received, that a PCM-word of this kind, received from the receiving arm of the four-wire-t.d.m. line, whose amplitude does not exceed a predetermined threshold value and a group of consecutive PCM-words of this kind, received from the transmitting arm of the four-wire-t.d.m. line, whose mean power value is greater than a predetermined fraction of the power of the aforementioned PCM-word received from the receiving arm are not taken into account, but that from PCM-words of groups of PCM-words which are taken into account on the basis of the aforementioned evaluation following an N-fold cycle a sum value of cross-correlation coefficients is determined, that moreover the module-individual control unit checks whether at this time the respective telecommunications connection is still in existence and, if so, depending upon whether the sum value of the cross-correlation coefficients is approximately zero or is smaller than or greater than a threshold value, the setting of the dummy impedance of the hybrid circuit of the respective subscriber line termination circuit is left unchanged, or a change is made to the next lower or next higher value.

The method in accordance with the invention exploits the fact that for every subscriber line a subscriber line termination circuit is provided in which the two-wire/four-wire conversion takes place, and that accordingly the line impedance of a specific line can be assumed to remain unchanged in the long term. Thus the circuit arrangement in accordance with the invention is designed such that it reaches an approximation of the optimum impedance value relatively slowly, but that as a result relatively few and simple circuitry components can be used.

In accordance with another aspect of the invention, the adaptation is carried out consecutively for different subscriber terminals, i.e. thus not in t.d.m. operation, so that the RAM storage space required by the group-individual control unit for the adaptive setting can be kept small.

In accordance with yet another aspect of the method in accordance with the invention the threshold evaluation of the PCM-words is carried out by the programmable interface which also inputs the PCM words where necessary.

According to a further aspect of the invention, the respective determined valid words for dummy impedances are stored by the module-individual control unit and, at the request of a higher-ranking control unit, are transferred to the latter by which they are then displayed.

A yet further aspect of the invention relates to a circuit arrangement for the implementation of the method corresponding to the invention, which is characterized in that it comprises a programmable interface circuit which is provided with a flow control unit which, stimulated by the module-individual control unit, interrogates the aforementioned PCM-words occurring on the receiving arm and the transmitting arm of the four-wire-t.d.m. line, and comprises a store which receives these PCM-words and, at the request of the module-individual control unit, forwards them to the latter.

In this circuit arrangement it is unnecessary for the module-individual control unit to fulfill real time requirements with regard to the reception of the PCM-words and it need not process the PCM-word until priority functions associated with the switching operation have been completed.

In an embodiment in accordance with the invention of the aforementioned circuit arrangement, the information line which primarily serves for the information exchange between the module-individual circuit and the higher-ranking control unit of the exchange is used for the PCM-word exchange between the store of the programmed interface and the module-individual control unit, leading to a reduction in outlay.

An alternative embodiment of the circuit arrangement corresponding to the invention is characterized in that the aforementioned flow control unit and the aforementioned store do not form part of the interface circuit but part of the individual subscriber line termination circuits.

In the following the invention will be explained in detail in the form of an exemplary embodiment making reference to a drawing in which.

Figure 1:
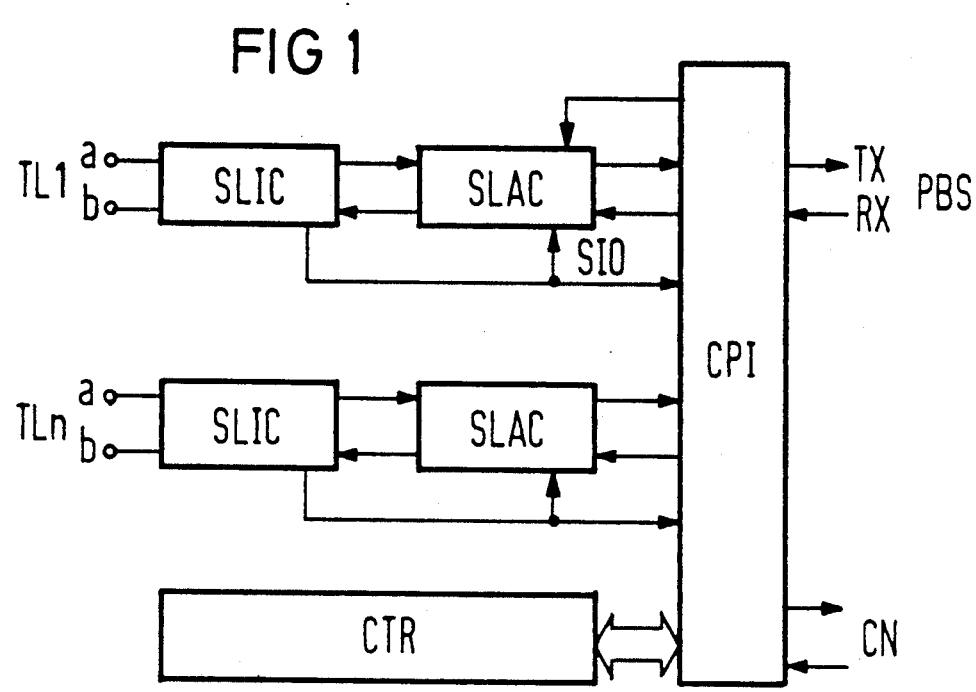
FIG. 1 is the block circuit diagram of the circuit arrangement in accordance with the invention.

FIG. 1 represents a subscriber line termination module for the connection of n subscriber lines TL1 to TLn. The assembly comprises subscriber line termination circuits which are individually assigned to subscriber lines and which are here classified into components SLIC and SLAC. The components SLIC of the subscriber line termination circuits are those which, of the so-called BORSCHT-functions, fulfill the functions of the battery, over-voltage protection, ringing, signals, supervision, and testing, whereas the components SLAC of the subscriber line termination circuits fulfill the functions of hybrid circuit, thus the two-wire/four-wire junction, and analogue-digital conversion and digital-analogue conversion and filtering (coding). With the assistance of a signal processor the function of adaptive dummy impedance is also fulfilled in this component SLAC.

Via an interface circuit CPI the aforementioned subscriber line termination circuits are connected to a four-wire-t.d.m. line PBS which serves to transmit speech signals from and to the switching network of the exchange to which the subscriber line termination module described hereinsofar is assigned. The four-wire line comprises a transmitting arm TX and a receiving arm RX. In practice more than one such t.d.m. line can also be provided.

The subscriber line termination circuits SLIC/SLAC are subject to the control influence of a module-individual control unit CTR. The communication between this control unit and the subscriber line termination circuits likewise takes place via the interface CPI, and the same applies to the communication between the module-individual control unit and a central control unit of the exchange, where the signal exchange takes place for example via a separate control network CN.

Figure 2:
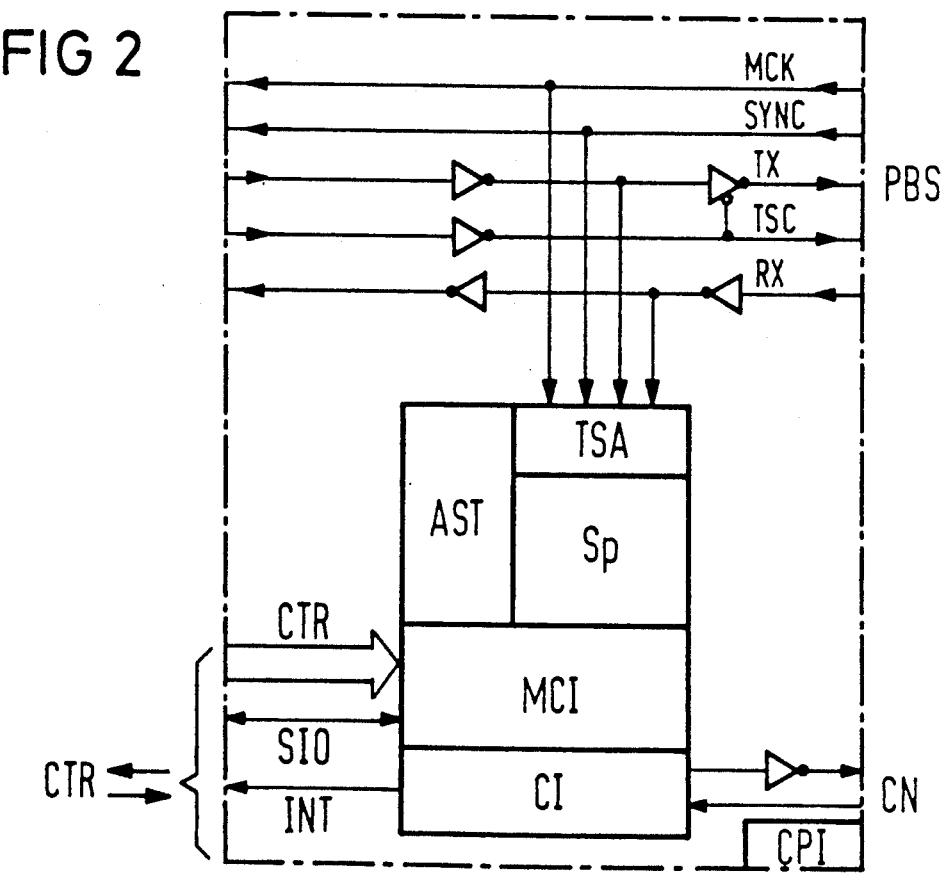
FIG. 2 is a more detailed diagram of the interface circuit of the circuit arrangement corresponding to the invention.

The aforementioned interface CPI can be programmed in accordance with the invention in that the module-individual control unit CTR has access to the transmitting arm TX and the receiving arm RX of the four-wire-t.d.m. line PBS. For this purpose, as can be seen from the exemplary embodiment shown in FIG. 2, it is provided for example with a flow control unit AST and a store Sp. Further components of the interface circuit CPI as shown in FIG. 2 consist of a microcomputer interface MCI via which the connection is established to the group-individual control unit CTR, and an interface CI via which a connection exists to the control network CN and to the central control unit of the exchange. A device TSA of the interface is associated with the time slot allocation which is to be effected by the components SLAC of the subscriber line termination circuits.

Figure 3:
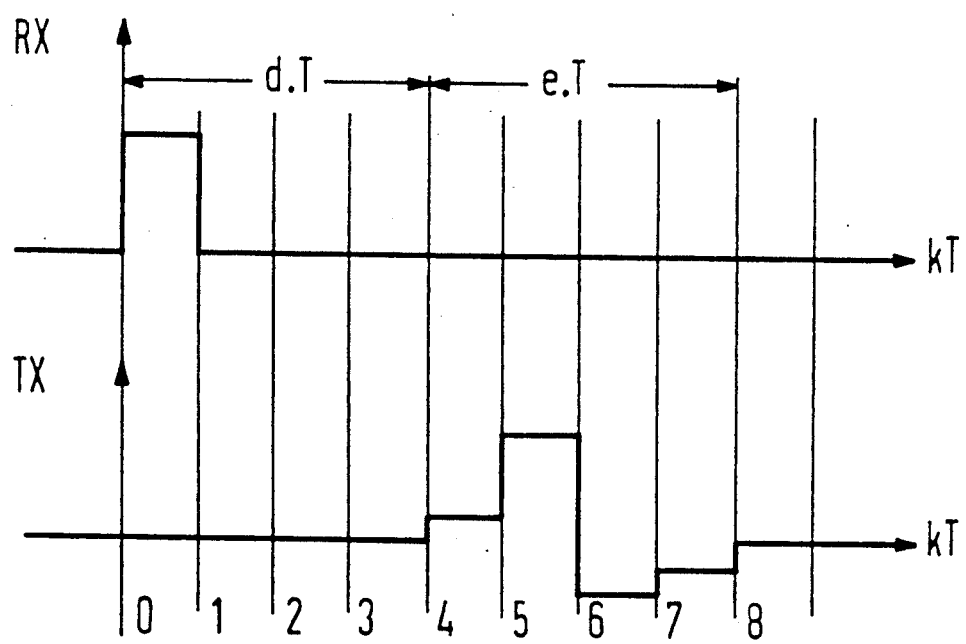
FIG. 3 is a pulse diagram illustrating the echo conditions in the case of mis-matching.

For the automatic setting of the dummy impedance of the hybrid circuit of a specified subscriber line termination circuit, the flow control unit AST of the programmable interface circuit CPI, activated by the module-individual control unit CTR in the course of a telephone connection switched-through to the subscriber terminal connected to the respective subscriber line termination circuit via the subscriber line TL, causes PCM-words, occurring on the receiving arm RX in the time slot of the time channel allocated to the connection, to be received in the store Sp of the interface circuit. This reception does not take place for every sample value, but at intervals of, for example, 20 ms which are long in relation to the sampling pulse frame which amounts, for example, to 125 us. As can be seen from FIG. 3, as a result of reflection on the hybrid circuit contained in the subscriber line termination circuit component SLAC, in the case of mis-matching these PCM-words which occur on the receiving arm result in the occurrence of echo signals on the transmitting arm TX with a delay of a plurality of sampling pulse frames (4 in the example shown in FIG. 3), which echo signals extend over a plurality of sampling pulse frames (likewise 4 in the example shown in FIG. 3).

Thus, following the aforementioned delay time and during the corresponding time slots of a plurality of - thus here 4 consecutive - sampling pulse frames, the flow control unit AST of the interface circuit CPI initiates the reception of the PCM-words occurring on the transmitting arm TX of the four-wire-t.d.m. line.

At the request of the module-individual control unit CTR, these PCM-words are transferred to this control unit. As stated, such cooperation between the flow control unit AST of the programmable interface and the module-individual control unit CTR has the advantage that the module-individual control unit is not hindered by the adaptation process in the handling of priority functions.

The module-individual control unit CTR now checks whether the PCM-words received from the receiving arm RX of the t.d.m.-four-wire line reach a predetermined threshold value in respect of their amplitude. If this is not the case, the respective PCM-word is not taken into account. The taking into account of PCM-words with amplitudes below this threshold would lead to results which are incorrect because of noise.

The aforementioned groups of PCM-words, which are received from the transmitting arm TX of the four-wire t.d.m. line in consecutive pulse frames, are likewise subjected to evaluation. If the mean power value of these PCM-words is greater than a predetermined fraction of the power of the aforementioned PCM-word received from the receiving arm, this PCM-word and the corresponding echo signals are not taken into account. This ensures that only those PCM-words received from the transmitting arm are analyzed which are actually echo signals or a PCM-word incoming on the receiving arm, and not a mixture of echo and useful signal. From the PCM-words which remain as a result of this evaluation and which are obtained by an N-fold repetition of the described access to the four-wire-t.d.m. line, where for example N=1000, the module-individual control CTR forms a sum value of the cross-correlation coefficients in accordance with the formula $$K_i = \frac{\sum_{K=1}^{N} RX(k) \cdot TX(k,i)}{\sum_{K=1}^{N} RX(k) \cdot RX(k)}$$

if the connection is still in existence at this time. If not, the results are not taken into account. A sum value of this kind indicates the extent of the dependency between a PCM word incoming in the receiving arm RX of the four-wire-t.d.m. line and the PCM-words which occur thereafter on the transmitting arm TX of the t.d.m. line. If $K_i=0$, this signifies that no correlation exists, and thus the PCM-words occurring on the transmitting arm are not echoes of the PCM-word which has occurred on the receiving arm, and that the dummy network exhibits a satisfactory line dummy impedance, in respect of the complete decoupling of the transmitting arm and receiving arm of the four-wire line. Accordingly, the existing values of the dummy network remain unchanged.

If $K_i$ has a value which is lower than a threshold value, the module-individual control unit CTR changes the dummy impedance to the next lower value, whereas if $K_i$ has a value which is greater than a threshold value, the next higher value of the dummy impedance is set.

The read-out of the PCM-words contained in the store Sp of the programmable interface circuit CPI to the module-individual control unit CTR takes place via the same series data line SIO which is used for the exchange of information between the module-individual control unit and the central control unit via the interface CPI. The reception of PCM-words associated with another connection or another subscriber line termination circuit does not take place until the procedures explained in the aforegoing have been entirely completed. In this way the RAM-storage space requirement in the module-individual control unit can be kept relatively small.

Figure 4:
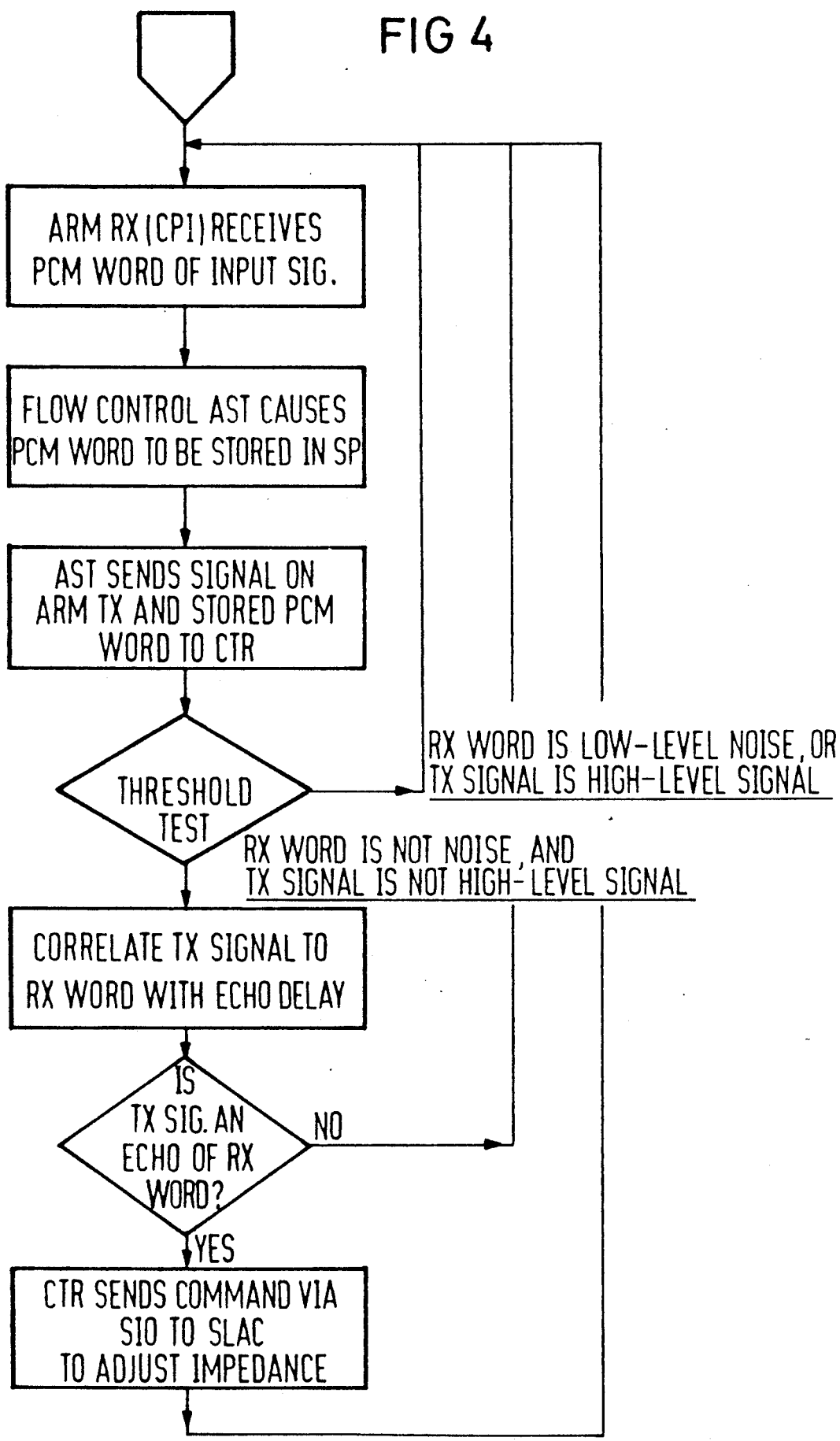
FIG. 4 is a flow chart depicting how the setting of subscriber line dummy inpedance is carried out by the circuit arrangement of FIGS. 1 and 2.

The above-described sequence of steps in the dummy impedance setting process is illustrated schematically in the flow chart of FIG. 4.

In accordance with FIG. 2 it has been assumed that in order to avoid real time problems for the reception of PCM-words in the module-individual control unit the interface circuit CPI comprises a flow control unit AST and a store SP. The control and storage functions implemented in the assemblies can also be fulfilled, however, in the components SLAC of the subscriber line termination circuits, so that a conversion of the PCM-words from non-linear coding, as occurring in transmission on the four-wire line, to linear coding, as is required for the formation of the cross-correlation coefficients, can take place in these subscriber line termination components SLAC so that, as such conversion procedures—which however are not related to the impedance setting—are anyhow executed therein, no large extra outlay is required.

In the case of the described design variant, the amplitude comparison of the PCM-words, which occur on the receiving arm of the four-wire-t.d.m. line which are intended for the subscriber terminal, with a threshold value is effected by the module-individual control unit.

As indicated, this comparison can also take place in the programmable interface which then also, when the threshold value is exceeded, initiates the storage of the respective PCM-word.

What is claimed is:

1. A method of setting the subscriber line dummy impedances of programmable hybrid circuits for a two-wire/four-wire junction, which form part of subscriber line termination circuits which are combined in a subscriber line termination module of a digital time division multiplex (t.d.m.) telecommunications exchange and which are subject to the control influence of a module-individual control unit, wherein via a programmable interface circuit, the module-individual control unit gains access to the transmitting and receiving arms of at least one four-wire-t.d.m. line which connects the subscriber line termination circuits to the switching network of the telephone exchange, such that individually for the individual subscriber line termination circuits, in the course of a respective telecommunications connection to a respective subscriber line termination circuit and to the subscriber terminal connected thereto via a subscriber line, at arbitrary intervals which are long in relation to the length of the sampling pulse frames, a PCM-word which occurs on the receiving arm of the at least one four-wire-t.d.m. line in the time slot allocated to the connection is received and, following a number of sampling pulse frames corresponding to a delay time for an echo signal arising from reflection at a hybrid circuit of a subscriber line termination circuit, PCM-words which occur on a transmitting arm of said at least one four-wire-t.d.m. line during corresponding time slots of a plurality of consecutive sampling pulse frames are received, wherein in an evaluation, a PCM-word received from a receiving arm of said at least on four-wire-t.d.m. line, whose amplitude does not reach a pre-determined threshold value, and a group of consecutive PCM-words received from said transmitting arm of said at least one four-wire-t.d.m. line, whose mean power value is greater than a predetermined fraction of the power of said PCM-word which occurs on the receiving arm, are not taken into account in said evaluation, but that from PCM-words and groups of PCM-words, taken into account in said evaluation following an N-fold cycle of cross-correlation coefficients is determined by the module-individual control unit, that the module-individual control unit also checks whether the respective telecommunications connection is in existence, and if so, depending upon whether the sum value of the cross-correlation coefficients is (a) approximately zero or (b) less than or (c) greater than a threshold value, accordingly the setting of a dummy impedance of a hybrid circuit of the respective subscriber line termination circuit is (a) left unchanged or (b) changed to a next lower value or (c) changed to a next higher value, respectively.

2. A method as claimed in claim 1, wherein the recited steps are completed with respect to the reception and processing of PCM-words before the reception and processing of PCM-words relating to another established telephone connection is commenced.

3. A method as claimed in claim 1, characterized in that the threshold evaluation of the received PCM-words is effected by the programmable interface circuit and that the programmable interface circuit also initiates storage of received PCM-words taken into account.

4. A method as claimed in claim 2, characterized in that the threshold evaluation of the received PCM-words is effected by the programmable interface circuit and that the programmable interface circuit also initiates the storage of the received PCM-words.

5. A method as claimed in claim 1, characterized in that the respective set values for the dummy impedances are stored by the module-individual control unit and, at the request of a higher-ranking control unit, are transferred to the higher-ranking control unit by which they are then displayed.

6. A method as claimed in claim 2, characterized in that the respective set values for the dummy impedances are stored by the module-individual control unit and, at the request of a higher-ranking control unit, are transferred to the higher-ranking control unit by which they are then displayed.

7. A method as claimed in claim 3, characterized in that the respective set values for the dummy impedances are stored by the module-individual control unit, at the request of a higher-ranking control unit, are transferred to the higher-ranking control unit by which they are then displayed.

8. A circuit arrangement for setting the subscriber line dummy impedances of programmable hybrid circuits for a two-wire/four-wire junction, which form part of subscriber line termination circuits which are combined in a subscriber line termination module of a digital time division multiplex (t.d.m.) telecommunications exchange coupled to at least one four-wire-t.d.m. line having a receiving arm and a transmitting arm, said circuit arrangement comprising a module-individual control unit coupled to a programmable interface circuit, wherein the module-individual control unit gains access to the transmitting and receiving arms of the at least one four-wire-t.d.m. line which connects the subscriber line termination circuits to the switching network of the telephone exchange, such that individually for the individual subscriber line termination circuits, in the course of a respective telecommunications connection to a respective subscriber line termination circuit and to the subscriber terminal connected thereto via a subscriber line, at arbitrary intervals which are long in relation to the length of the sampling pulse frames, a PCM-word which occurs on the receiving arm of the at least one four-wire-t.d.m. line in the time slot allocated to the connection is received and, following a number of sampling pulse frames corresponding to a delay time for an echo signal arising from reflection at a hybrid circuit of a subscriber line termination circuit, PCM-words which occur on a transmitting arm of said at least one four-wire-t.d.m. line during corresponding time slots of a plurality of consecutive sampling pulse frames are received, evaluation means for performing a threshold evaluation of the PCM-word and group of PCM-words, wherein the PCM-word received from the receiving arm of said at least one four-wire-t.d.m. line, whose amplitude does not reach a predetermined threshold value, and the group of consecutive PCM-words received from said transmitting arm of said at least one four-wire-t.d.m. line, whose mean power value is greater than a predetermined fraction of the power of said PCM-word which occurs on the receiving arm, are not taken into account in said evaluation, correlation means provided with said module-individual control unit wherein, for the received PCM-word and the transmitted group of PCM-words which are taken into account by said evaluation means, a sum value of cross-correlation coefficients is determined by the module-individual control unit, and the module-individual control unit also checks whether the respective telecommunications connection is in existence, and if so, depending upon whether the sum value of the cross-correlation coefficients is (a) approximately zero or (b) less than or (c) greater than a threshold value, accordingly said module-individual control unit causes the setting of a dummy impedance of a hybrid circuit of the respective subscriber line termination circuit to be (a) left unchanged or (b) changed to a next lower value or (c) changed to a next higher value, respectively, and said programmable interface circuit being provided with a flow control unit which, upon activation by the module-individual control unit, interrogates the aforementioned PCM-words which occur on the receiving arm and the transmitting arm of the four-wire-t.d.m. line, and a store which receives these PCM-words and, at the request of the module-individual control unit, transfers the PCM-words to the latter.

* * * * *